Jan. 18, 1944.　　　　F. F. TONE　　　　2,339,439
MIXING BOWL HANDLING MECHANISM
Filed Dec. 17, 1941　　　3 Sheets-Sheet 1

INVENTOR
FREDERICK F. TONE
BY George S. Hastings
ATTORNEY

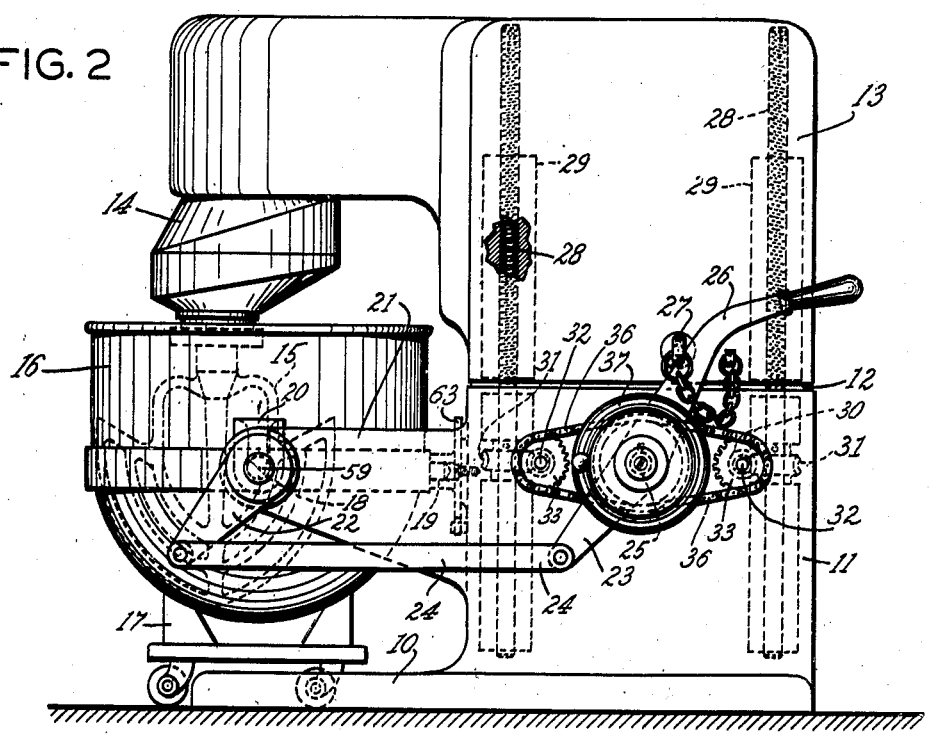
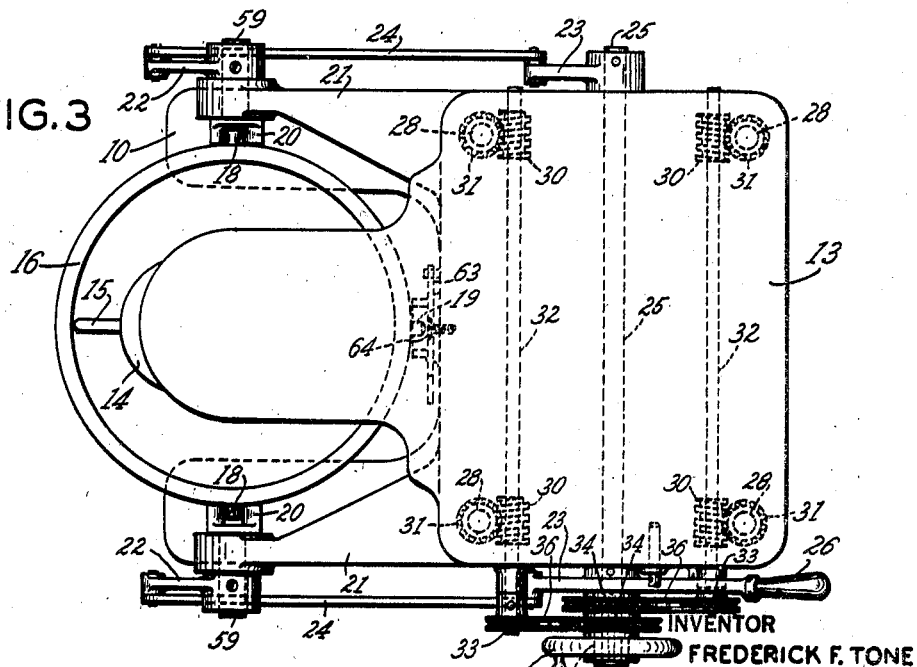

Jan. 18, 1944.   F. F. TONE   2,339,439
MIXING BOWL HANDLING MECHANISM
Filed Dec. 17, 1941   3 Sheets-Sheet 3

INVENTOR
FREDERICK F. TONE
BY *Georges Hastings*
ATTORNEY

Patented Jan. 18, 1944

2,339,439

UNITED STATES PATENT OFFICE 2,339,439

MIXING BOWL HANDLING MECHANISM

Frederick F. Tone, Baldwin, N. Y., assignor to American Machine & Foundry Company, a corporation of New Jersey Application December 17, 1941, Serial No. 423,287

10 Claims. (Cl. 259—1)

This invention relates to mixing machines, and more particularly to mixing machines of the vertical type in which a mixing receptacle is positioned beneath a rotating beater so that the latter can revolve in the receptacle to mix a batch of material to the proper consistency.

In reducing the cost of baked food products, it has been found desirable in the baking art to perform certain operations on a large scale. This characteristic has been particularly true in mixing large batches of the various ingredients which go into the finished baked product. The mixing of large batches at one time not only is found to be more economical but also produces greater uniformity in the final product because any inaccuracy in the amount of any individual ingredient used would tend to cancel itself out in a large batch. This trend has called for larger mixing bowls, and in satisfying this demand certain difficulties have been encountered in handling the bowl and mixing the contents thereof. This can be easily realized when it is noted that the weight of a large vertical type mixer runs about 9500 pounds, the beater 100 to 150 pounds, and the loaded bowl about 500 to 600 pounds.

Heretofore, traveling saddles have been employed which rise up around the bowl to grip the bowl around its circumference to properly secure the same for the mixing operation, and also to raise the bowl into engagement with the beater mechanism. Such a traveling saddle involves the use of a more or less expensive mechanism because the bowl has to be properly aligned with the beater so that as the rotating beater revolves adjacent the circumference of the bowl, it will cause a wiping action of the sides thereof without rubbing any metal from the bowl which would contaminate the dough.

It is therefore an object of this invention to provide a simplified bowl securing means which will have all the advantages found in the aforementioned bowl raising saddle.

It is also an object to avoid the necessity of lifting a bowl and instead to satisfactorily lock it in place and lower the beater mechanism into the bowl.

Another object is to provide a simplified bowl handling and mixing device which will be able to handle large quantities of dough and still avoid the necessity of dismantling the beater from the head each time the bowl is removed, or of having a moving saddle support for holding the bowl in place.

Another object is to provide a stationary bowl support into which a large bowl can be pushed along a horizontal path of travel.

A further object is to provide a bowl support which will allow an operator to readily place ingredients therein without the aid of an adjoining platform.

Other objects and features of the invention will appear as the description of the particular physical embodiment selected to illustrate the invention progresses.

In the accompanying drawings, which form a part of this specification, like characters of reference have been applied to corresponding parts throughout the several views which make up the drawings, in which:

Fig. 2 shows the bowl in locked position, and the beater and beater head in lowered mixing position.

Fig. 3 is a top view of the mixing mechanism shown in Fig. 2.

Figure 1:
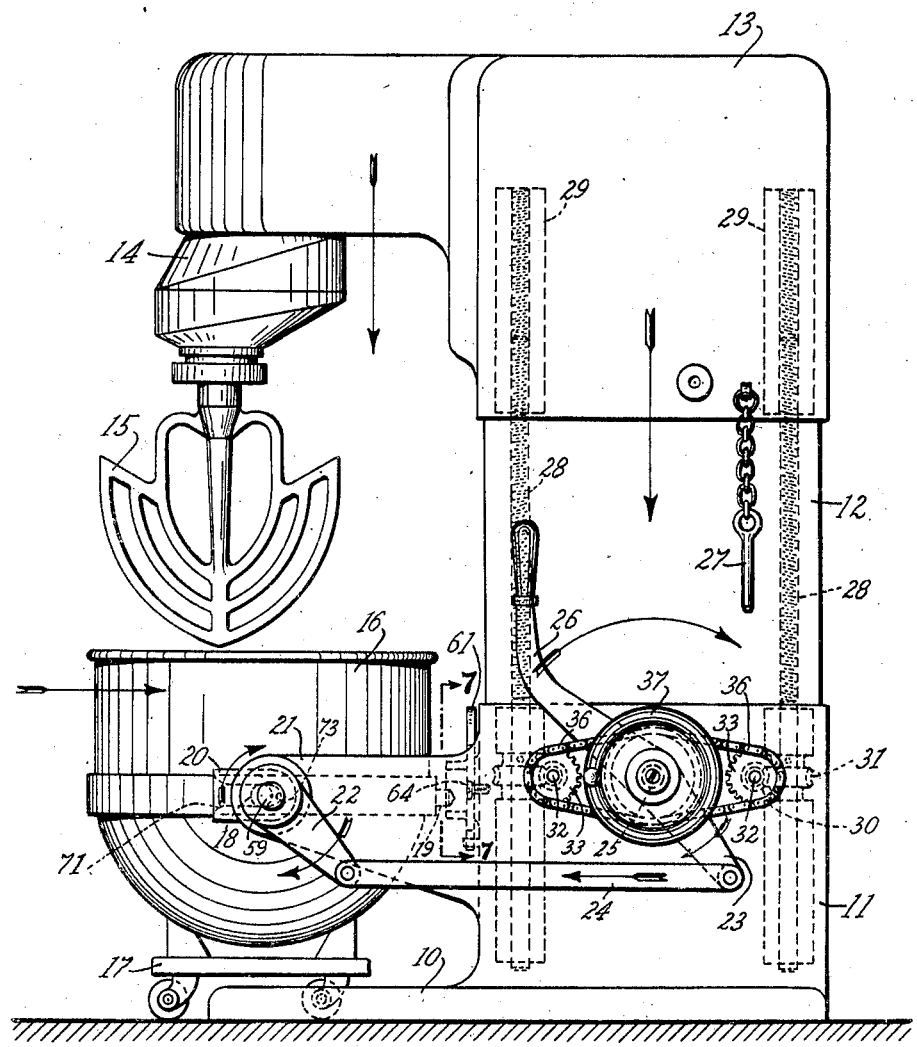
Fig. 1 is a side view showing the bowl in unlocked position under the beater, and the beater head in raised position.

Referring to Figs. 1, 2 and 3, the mixing machine has a conventional base 10 and mounted on one end of said base is a vertically extending support 11, the upper part 12 thereof forming a guide shield for the head supporting and elevating shell 13. Connected to the shell 13 is a conventional beater mechanism 14 for imparting a conventional revolving motion and also a planetary motion to the beater 15. The structure of such beater mechanism may be similar to that shown in U. S. Patent Re. 18,096. The bowl 16 is carried on dolly 17 and has supporting trunnions 18 mounted upon opposite sides of the bowl, and a suitable lug 19 which aids in preventing the bowl from having any tilting motion.

U-shaped trunnion receiving members 20 are pivotally mounted upon the supporting bracket 21 and are so constructed that they will receive and lock the trunnions on the bowl in position without raising or lowering the bowl. The trunnion engaging portion of each member 20 has a slot provided with flared ends 71 which merge into and cooperate with the tapering guide tracks 72 to guide the trunnions 18 into the concave seats 73 at the inner ends of said slots. In the present showing, Fig. 4, the pivotal points of members 20 are in exact alignment with the center points of the trunnions 18, seats 20 having the same radius of curvature as the trunnions and being concentric with the axes of the latter. Members 20 are fixedly connected to shafts 59 which revolve in suitable bearings formed in brackets 21 (Fig. 3). Also, fixedly connected to shafts 59 are actuating arms 22 which receive actuating motion through links 24 from lever arms 23. The lever arms 23 are fixedly connected to the shaft 25 which is supported in bearings formed in the vertically extending support 11. One of the lever arms 23 has an oppositely extending operating lever 26 by means of which the operator actuates the U-shaped trunnion supporting members 20 so as to lock the bowl 16 in position. The operating lever 26, after it has locked the bowl in position, is secured against reopening by means of a suitable safety latch and chain 27, as shown in Fig. 2.

The lifting shell 13 is supported, raised and lowered by means of screws or spindles 28 which are threaded into nuts 29 fixed to the lifting shell 13. The shield 12 acts as a cover to keep out foreign material which might otherwise get inside the mixer. Rotating motion is imparted to each of the screws 28 by means of worms 30 fixed on each of the shafts 32 and meshing with worm wheels 31, each of which is fixedly connected to one of the screws 28. The worms 30 are fixedly mounted upon the shafts 32, the latter being suitably supported in bearings formed in the supporting member 11. Sprockets 33 fixedly connected to shafts 32 impart operating motion to the worms 30. Sprockets 34 are fixedly connected to the sleeve member 35 which is freely mounted upon the shaft 25. Sprockets 33 and 34 are interconnected by suitable sprocket chains 36, all of which are actuated through the hand operated crank wheel 37 which is also fixedly mounted upon the sleeve 35 (Fig. 3). By cranking the wheel 37, the shell 13 will be raised or lowered, depending upon which way the wheel 37 is turned.

Figure 4:
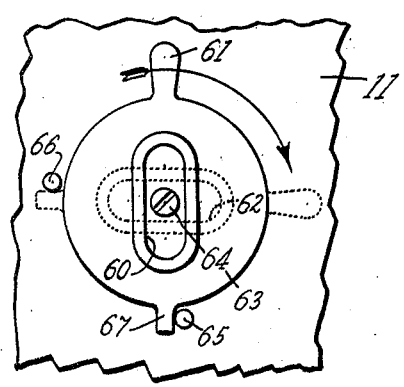
Fig. 4 is taken along the line 7—7 of Fig. 1, and shows the locking mechanism of the bowl in greater detail.
Figure 5:
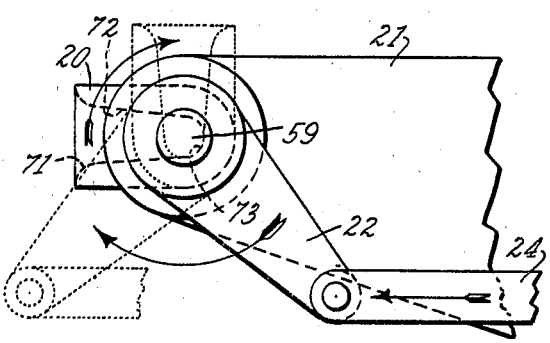
Fig. 5 is a detail view showing the lug securing and locking device which ensures the bowl against any tilting action.

Fig. 4 shows the details of the lug locking device employed for securing the bowl against swinging motion in the mixing operation. When the bowl is pushed into place, the lug 19 enters into the lug receiving slot 60 which at that moment is in the position shown in full lines in Fig. 4. The trunnion securing members 20 are then turned to lock the bowl against further horizontal movement. After this, the operator by means of handle 61 turns the slotted member 60 into the dotted position 62 (Fig. 4) to positively lock the bowl against any swinging motion while it is secured and locked in position by means of members 20. Disk 63, supporting the slotted locking device 60, is revolvably secured to the frame of the machine by suitable means such as retaining screw 64. Lug 67 formed on disk 63 limits the distance said disk can rotate by engaging with either stop pin 65 or stop pin 66, both of which are mounted in the frame 11.

It is to be noted that the bowl is pushed along a horizontal path of travel and there is no need for raising the bowl to get it into locking position. As a result, an operator can place a five or six hundred pound bowl into mixing position with almost no effort, and the bowl can be just as readily removed. All the expensive mechanism heretofore necessary where a traveling saddle was used has now been avoided so that the construction cost of a vertical mixer can be materially reduced.

Not only has the efficiency of the operator been increased by keeping the bowl low so that the ingredients of the mix will have to be raised a minimum distance from the floor to place them in the bowl, but the vertical mixer has been rendered safer by providing a bowl locking device which will prevent the bowl from getting out of alignment with the traveling and revolving beater, thereby eliminating the possibility of contamination due to the chipping off of metal from the bowl in the mixing process. The bowl is also, by more simplified mechanism, positively secured against movement during the mixing operation.

The invention above described may be varied in construction within the scope of the claims, for the particular device selected to illustrate the invention is but one of many concrete embodiments of the same. The invention, therefore, is not to be restricted to the precise details of the structure shown and described.

What is claimed is:

1. A mixing machine of the vertical type having a frame, a movable mixing bowl, projecting trunnions fixedly connected to at least two sides of said bowl, bowl supporting arms rigidly connected to said frame, U-shaped trunnion receiving members having flared ends adapted to receive and guide said trunnions along a horizontal path of travel to seat said trunnions in said members, said members being pivotally mounted in said arms, means for pivoting said U-shaped members to turn the flared ends thereof upward to lock said bowl in place while maintaining the bowl free from vertical travel, a rotatable beater for mixing the contents of said bowl, a support for said beater movably connected to said frame, and means for lowering said beater into said mixing bowl to mix the contents thereof and to raise said beater after the mixing operation to permit removal of the bowl.

2. A mixing machine of the vertical type having a frame, a movable mixing bowl, projecting trunnions fixedly connected to at least two sides of said bowl, bowl supporting arms rigidly connected to said frame, U-shaped trunnion receiving and locking members pivotally connected to said arms, the center of said trunnion being in alignment with the pivot axis of said U-shaped member to avoid lifting the bowl when said U-shaped member is pivoted to lock said trunnions against horizontal travel, means for pivoting said U-shaped members to lock said bowl in place, a rotatable beater for mixing the contents of said bowl, a support for said beater movably connected to said frame, and means for lowering said beater into said mixing bowl when said bowl is in locked position to mix the contents thereof and for raising said beater to permit removal of the bowl after the mixing operation without detaching the beater.

3. A mixing machine of the vertical type having a frame, a movable mixing bowl, projecting trunnions fixedly connected to opposite sides of said mixing bowl, a stud projecting from one side of said bowl between said projecting trunnions, a pair of oppositely disposed arms rigidly secured to the frame of said machine for supporting said bowl, trunnion receiving members for holding and securing said bowl against horizontal movement, a lug receiving means for securing said bowl against tilting during the mixing operation, a rotatable beater, mechanism for rotating said beater, and a support for said beater adapted to lower the beater into said bowl to mix the contents thereof as it is secured in position and to raise said beater clear of said bowl after the mixing operation is complete.

4. A mixing machine of the vertical type having a frame, a movable mixing bowl, projecting trunnions fixedly connected to at least two sides of said bowl, stationary supporting arms fixedly positioned with respect to said frame, U-shaped trunnion receiving yokes adapted to receive said trunnions along a horizontal path of travel to seat said trunnions in said yokes, said yokes being pivotally connected to said bowl supporting arms, means for locking said bowl against horizontal movement in said yokes, a rotatable beater for mixing the contents of said bowl, a support for said beater movably connected to said frame, and means for lowering said beater into said mixing bowl to mix the contents thereof and to raise said beater after the mixing operation to permit removal of the bowl.

5. A mixing mechanism comprising, a movable mixing bowl, trunnions mounted on at least two sides of said bowl, a locking device for said bowl associated with said mixing mechanism for holding said bowl in position while maintaining it free from vertical movement, said bowl locking device comprising pivotally mounted U-shaped trunnion receiving members for receiving said trunnions along a horizontal path of travel, means for pivoting said U-shaped members to turn said U-shaped members away from a horizontal plane to lock said trunnions against horizontal movement, a head movable relative to said U-shaped trunnion receiving members, a beater connected to said head, and means for lowering said beater into said bowl.

6. A mixing machine resting on the floor of a bakery and comprising, a head, a rotary beater connected to said head, a mixing bowl removably associated with said machine, trunnions mounted on at least two sides of said bowl, locking devices carried by said machine and arranged to admit said trunnions as said bowl is moved horizontally along said floor, mechanism for moving said devices after they admit said trunnions to lock them in position and thereby prevent movement of the bowl, and means for lowering said beater into said bowl when it is locked in position.

7. A mixing machine of the vertical type having operating mechanism for imparting rotary and planetary motion to a beater, a movable mixing bowl, trunnions mounted on at least two sides of said bowl, a bowl support fixedly connected to said machine, said support comprising spaced bowl receiving arms, locking devices mounted on said arms constructed and arranged to coact with said trunnions, means operable after a bowl is positioned on said arms for locking said devices and trunnions together, and means for lowering said beater into a bowl held in mixing position by said bowl support.

8. A mixing machine of the vertical type having operating mechanism for imparting rotary and planetary motion to a beater, a movable mixing bowl, trunnions mounted on at least two sides of said bowl, a bowl support fixedly connected to said machine, said support comprising spaced bowl receiving arms, trunnion receiving members having converging trunnion receiving tracks, means for turning said tracks and members away from horizontal position to lock said bowl against movement during the mixing operation, and means for lowering said beater into a bowl held in mixing position by said bowl support.

9. A mixing machine of the vertical type having a frame resting on the floor of a bakery, a movable mixing bowl having a horizontally projecting member arranged at a predetermined distance from said floor, a bowl support rigidly and immovably connected to said frame and adapted to admit said bowl as it is moved horizontally along said floor, means associated with said bowl support for receiving said projecting bowl member, as said bowl is moved horizontally along said floor into position within said bowl support, a device for relatively moving said bowl and said means to lock said bowl member in said means and thereby locking said bowl in position on said bowl support, a rotatable beater, a support for said beater positioned above said bowl support, means for lowering and raising said beater support along a substantially straight vertical path to lower said beater into the mixing bowl to mix the contents thereof as the bowl is held in locked position in said support and raise said beater out of the bowl after the mixing operation, and means for operating said beater.

10. A mixing machine of the vertical type having a frame resting on the floor of a bakery, a movable mixing bowl having a plurality of horizontally projecting members arranged at a predetermined distance from said floor, a bowl support rigidly and immovably connected to said frame and adapted to admit said bowl as it is moved horizontally along said floor, means associated with said bowl support for receiving said projecting bowl members, as said bowl is moved horizontally along said floor into position within said bowl support, a device for moving said means to lock said bowl members in said means and thereby locking said bowl in position on said bowl support, a rotatable beater, a support for said beater positioned above said bowl support, means for lowering and raising said beater support along a substantially straight vertical path to lower said beater into the mixing bowl to mix the contents thereof as the bowl is held in locked position in said bowl support and raise said beater out of the bowl after the mixing operation, and means for operating said beater.

FREDERICK F. TONE.